3 Sheets--Sheet 1.

W. BURDON.
Improvement in Steam Water-Elevators.

No. 130,276.  Patented Aug. 6, 1872.

Witnesses
Fred Haymer
R. T. Rabecu

W. Burdon

3 Sheets--Sheet 2.

W. BURDON.

Improvement in Steam Water-Elevators.

No. 130,276. Patented Aug. 6, 1872.

Witnesses
Fred Haynes
R. I. Rabeau

Wm Burdon

AM. PHOTO-LITHOGRAPHIC CO. N.Y. (OSBORNE'S PROCESS.)

3 Sheets--Sheet 3.
W. BURDON.
Improvement in Steam Water-Elevators.
No. 130,276. Patented Aug. 6, 1872.
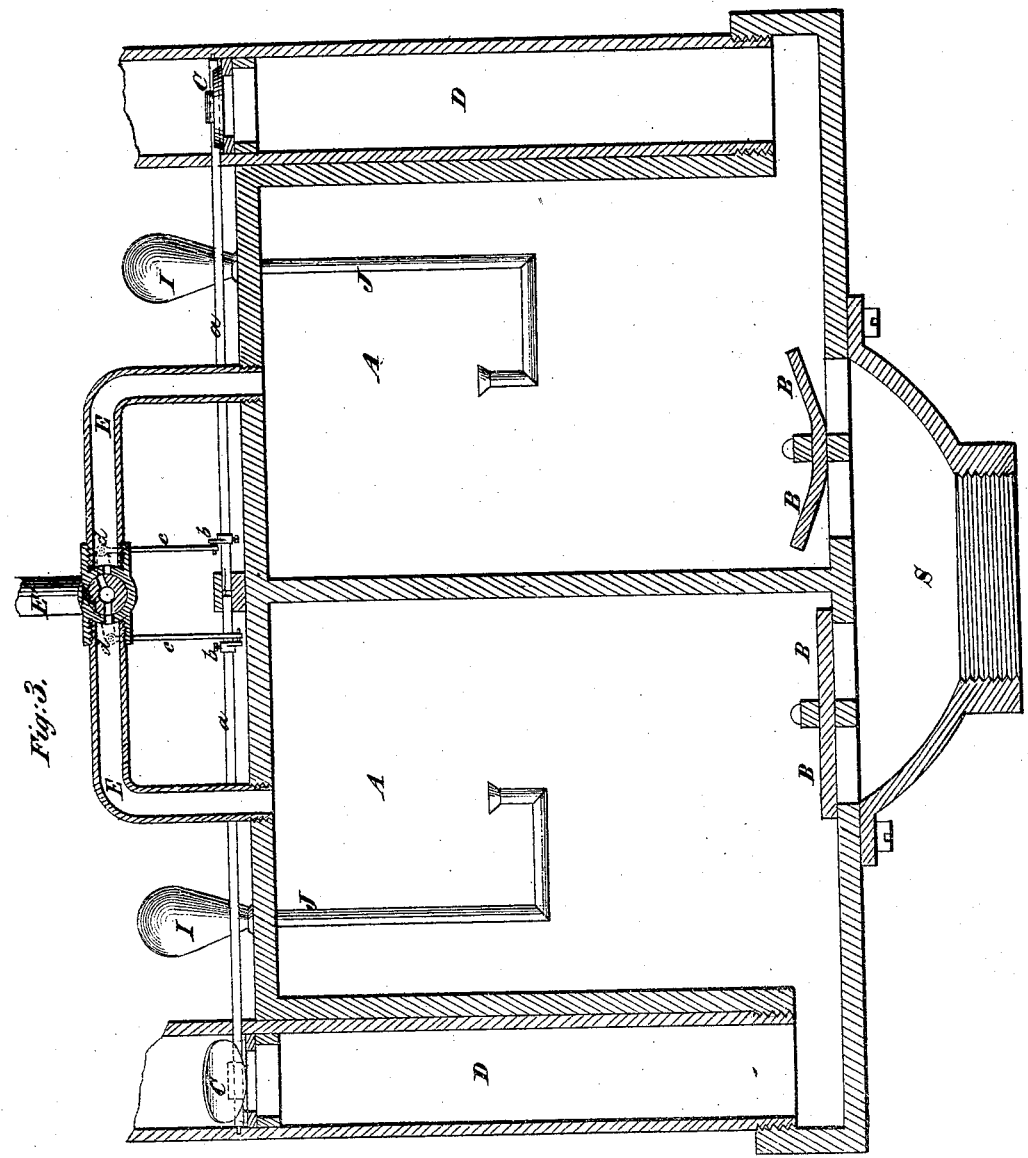
Witnesses
Fred Haynes
R. I. Raben
W. Burdon

UNITED STATES PATENT OFFICE.

WILLIAM BURDON, OF BROOKLYN, NEW YORK.

IMPROVEMENT IN STEAM WATER-ELEVATORS.

Specification forming part of Letters Patent No. 130,276, dated August 6, 1872; antedated August 5, 1872.

*To all whom it may concern:*

Be it known that I, WILLIAM BURDON, of the city of Brooklyn, in the county of Kings and State of New York, have invented a new and useful Improvement in Apparatus for Raising and Forcing Water by the Condensation and Pressure of Steam; and I do hereby declare that the following is a full, clear, and exact description of the same, reference being had to the accompanying drawing forming part of this specification.

This invention relates to that kind of apparatus for raising and forcing water in which a vacuum is formed by the condensation of steam, and the water which is raised by atmospheric pressure into the vacuum so formed is afterward expelled from the apparatus by the pressure of steam, the condensation of which is again made to form a vacuum for the repetition of the operation. The improvement consists in the connection of the water-discharge valves with the steam-inlet valves or cocks, whereby the necessary movements of the latter are effected by the movements of the former.

Figure 1:
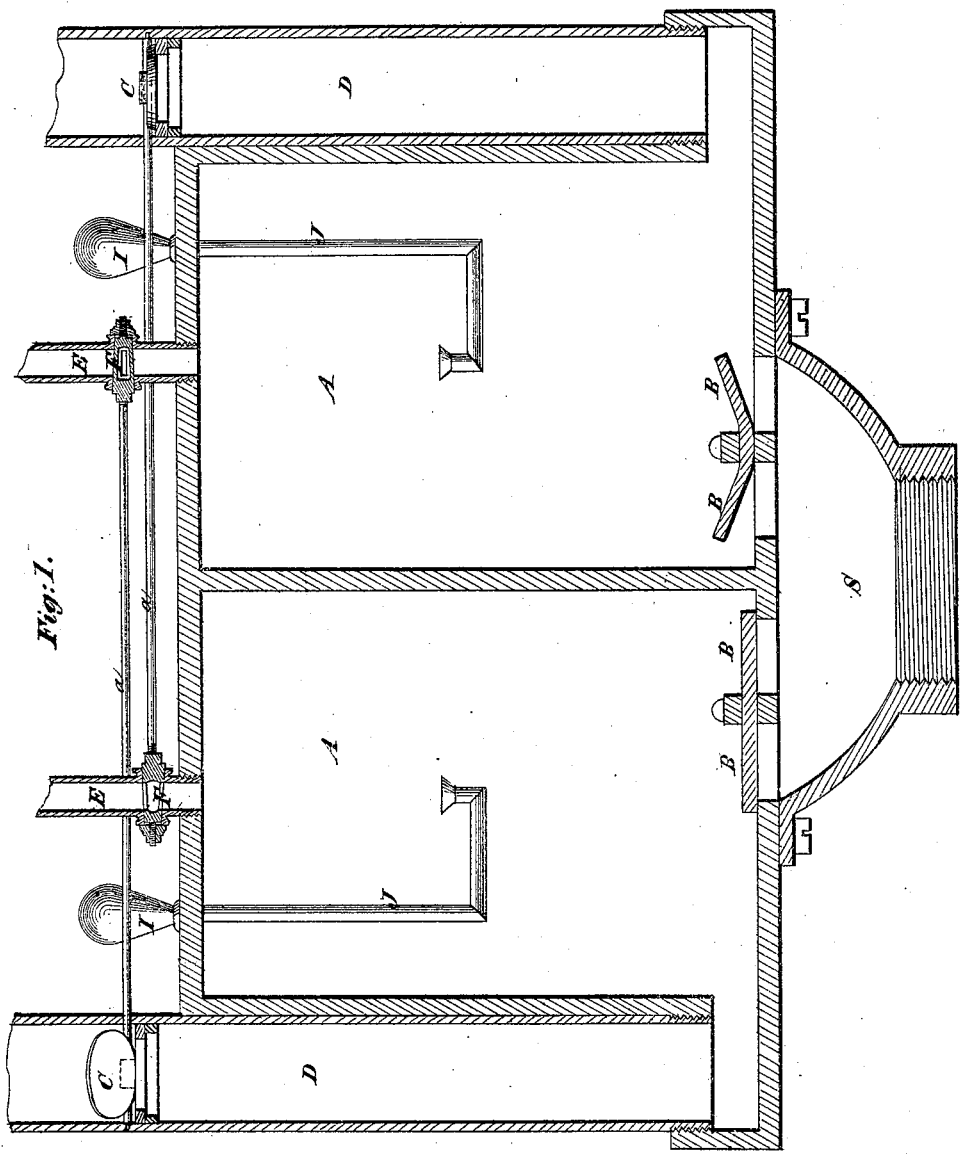
Figure 2:
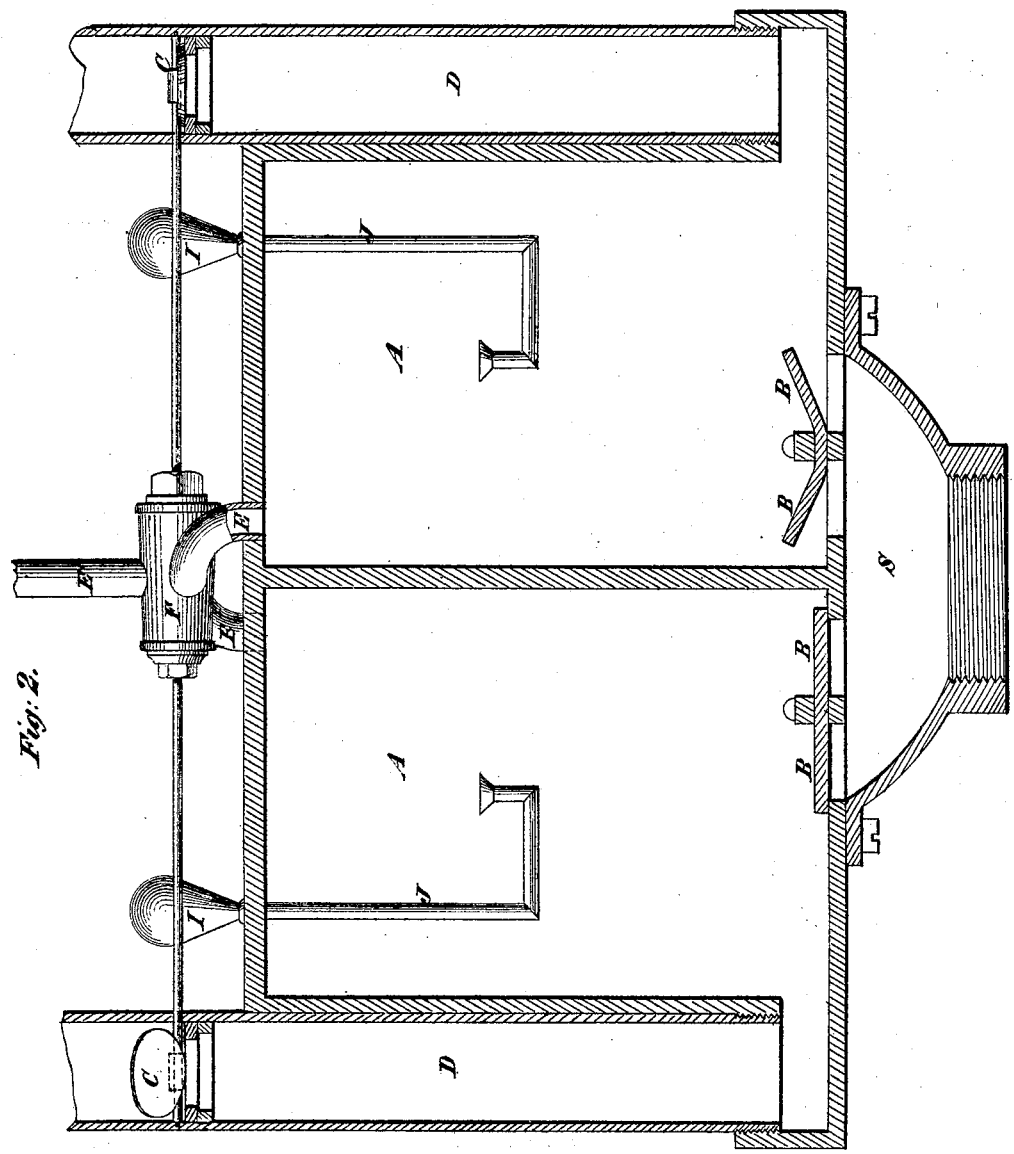

Figures 1, 2, and 3 in the accompanying drawing are vertical sections of three apparatus illustrating as many different methods of applying my invention.

Similar letters of reference indicate corresponding parts in the several figures.

A A are two water-chambers, which may be arranged side by side, as represented, or in any other convenient form. Each communicates at its bottom through a valve, B, with a suction-pipe, S, and each is furnished with water-discharge pipe, D, which communicates with it at a short distance from its bottom, and which is furnished above the chamber, at some distance above the communication of the pipe therewith, with a discharge-valve, C, opening upward. The two discharge-valves are connected each with a spindle, $a$, which is turned on its axis by the opening and closing of the valve. Each chamber has also connected with it at the top a pipe, E, for the admission of steam. As far as they are thus described, the three apparatus are precisely alike, and the only difference between them is in the provisions for admitting and shutting off the steam to and from the chambers. I will first describe the provision made for that purpose in the apparatus shown in Fig. 1, and the operation of that apparatus, and afterward describe the modifications of that provision made in the apparatus shown in Figs. 2 and 3. Each steam-pipe E, shown in Fig. 1, is furnished with a separate cock for admitting and shutting off the steam to and from its respective chamber A, and the plug of the cock belonging to either chamber A has its axis in line with the axis of the spindle $a$ of the discharge-valve C in the water-discharge pipe D of the other chamber, and is connected directly with such spindle, the arrangement of each cock F and its connected valve C being such that the opening of the valve effects the closing of the cock, and the closing of the valve effects the opening of the cock.

The operation of the apparatus is as follows: The two chambers A A having been filled with water, either by pouring it into them through suitable openings provided for the purpose—such openings being closed when the chambers are full—or by any other means, steam is admitted into either chamber by opening its respective cock F, the cock F belonging to the other chamber being closed. I will suppose the cock F of the left-hand chamber to be open and that of the right-hand chamber to be closed, the discharge-valve C of the left-hand chamber being at the same time open and that of the right-hand chamber being closed. Steam then enters the left-hand chamber and forces out the water therefrom through its discharge-pipe D and valve C until the level of the water gets down to the bottom of the discharge-pipe, when the water below the valve C, or a portion of it, descends, and by condensing the steam, or a portion of it, produces a vacuum or partial vacuum in the chamber, and causes valve C to close. The closing of this valve produces the opening of the steam-cock F of the right-hand chamber, and so admits steam to that chamber above the water, which is forced out therefrom through its pipe D, opening its discharge-valve C. The opening of the latter valve effects the closing of the steam-valve F of the left-hand chamber and shuts off the steam from that chamber, which then fills with water from the suction-pipe S. The repetition of this operation of opening and closing the steam-cocks is effected by the closing and opening of the water-discharge valves every time either chamber has its water discharged and a vacuum or partial vacuum produced in it, the steam-cock of each chamber being operated by the water-discharge valve of the other chamber, and in this way the chambers are alternately filled and discharged automatically. In order to expedite the production of the vacuum in the chambers A A, I propose generally to furnish each with a pipe, J, communicating with an air-chamber, I, into which air is compressed by the forcing of water into its pipe when the water-chamber A is being discharged by the pressure of steam. The discharge of the water from this pipe by the expansion of the air in the air-vessel, which takes place as soon as the pressure is reduced in the chamber A by the condensation of a portion of the steam in it, quickly condenses the remaining steam, and so expedites the refilling of the chamber with water, and renders the action of the apparatus more rapid.

In the modification shown in Fig. 2, instead of there being a separate valve or cock in each pipe E, one three-way cock, F, is made to admit and shut off steam to and from both of said pipes, the said cock receiving the steam through a single main pipe, E', and having its passages so arranged as to give steam to either pipe E, always shutting it off from the other while it is giving to one. The two discharge-valves C C and the plug of the cock F are all attached to the same spindle $a$, and the arrangement of the said valves C C is such that either is open when the other is closed, and that the discharge-valve C and pipe E belonging to either chamber A are open together. By this arrangement, when a vacuum is produced in either chamber A after the water has been forced out therefrom, the opening of its discharge-valve C, which then takes place, produces such a movement of the valve F as will admit steam to that chamber and shut it off from the other one, closing the discharge-valve of the other chamber at the same time.

In the modification shown in Fig. 3 a hollow rolling valve, F, is substituted for the cock F, shown in Fig. 2, the said valve receiving steam through its interior from a pipe, E', and giving it to either pipe E, and at the same time shutting it off from the other by a very slight movement on its axis. The water-discharge valves C C may, like those shown in Fig. 2, be connected with the same spindle, so that one closes while the other opens; but they are shown connected to separate spindles $a$ $a$, arranged in line with each other, and these spindles are connected by short arms $b$ $b$ provided on them and rods $c$ $c$ connected with the said arms and with opposite ends of a lever, $d$, secured to the valve F. The opening of the valve C of either chamber A produces a movement of the valve F, which admits steam to that chamber and shuts it off from the other one, and at the same time produces the closing of the other valve C, the operation being essentially the same as in the modification shown in Fig. 2.

I do not confine myself to any particular construction or arrangement of a system of connections between the valves or the valves and cocks for discharging water and admitting steam; but

What I claim as my invention, and desire to secure by Letters Patent, is—

The combination of the water-discharge valves and the steam-inlet valves or cocks, whereby the operation of the latter is produced by the movements of the former, as herein set forth.

WM. BURDON.

Witnesses:
FRED. HAYNES,
R. E. RABEAU.